US012658457B2

(12) United States Patent
Korn

(10) Patent No.: US 12,658,457 B2
(45) Date of Patent: Jun. 16, 2026

(54) STACK PLATE, STACK PLATE DEVICE AND HUMIDIFIER

(71) Applicant: MANN+HUMMEL GmbH, Ludwigsburg (DE)

(72) Inventor: Alexander Korn, Gueglingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 448 days.

(21) Appl. No.: 18/475,811

(22) Filed: Sep. 27, 2023

(65) Prior Publication Data

US 2024/0186542 A1 Jun. 6, 2024

(30) Foreign Application Priority Data

Dec. 1, 2022 (EP) ...................................... 22210894

(51) Int. Cl.
*H01M 8/04119* (2016.01)
(52) U.S. Cl.
CPC ................................ *H01M 8/04149* (2013.01)
(58) Field of Classification Search
CPC ................................................. H01M 8/04149
USPC ......................................................... 261/104
See application file for complete search history.

(56) References Cited

U.S. PATENT DOCUMENTS 8,919,746 B2 * 12/2014 Vanderwees ...... H01M 8/04141
261/104
9,735,438 B2 * 8/2017 Vanderwees ......... B01D 69/106

10,840,521 B2 * 11/2020 Desjardins .......... H01M 8/1093
11,022,330 B2 * 6/2021 Allen ..................... F28D 9/0037
12,255,364 B2 * 3/2025 Bauer ............... H01M 8/04141
2004/0142226 A1 7/2004 Yamauchi et al.
2013/0101909 A1 * 4/2013 Fasold .................... B01D 69/00
261/101
2015/0171445 A1 * 6/2015 Fasold .............. H01M 8/04149
261/105

(Continued)

FOREIGN PATENT DOCUMENTS

DE 102013208877 A1 11/2013
EP 2065958 A1 6/2009
(Continued)

OTHER PUBLICATIONS

English Machine Translation of WO 2022047166 A1 (Year: 2022).*
EPO Search Report in corresponding EPO Appln. No. 22210894.6, Apr. 20, 2023, Munich, Germany.

*Primary Examiner* — Charles S Bushey

(57) ABSTRACT

A stack plate of a stack plate device of a humidifier includes inlay parts extending along two opposing front or longitudinal ends of the stack plate, a semipermeable layer disposed on and being stabilized by the inlay parts, and a frame disposed on multiple portions of the semipermeable layer that are disposed on the inlay parts, the frame circumferentially enclosing a through-opening in the stack plate. A remaining portion of the semipermeable layer completely covers the through-opening. An outer circumferential section of the semipermeable layer and the inlay parts are overmolded by the frame. Opposing front ends of the frame define inflow and outflow regions, respectively, on a first side of the frame for a second fluid, and opposing longitudinal ends of the frame define inflow and outflow regions, respectively, on a second side of the frame for a first fluid.

12 Claims, 12 Drawing Sheets

(56)                    References Cited

U.S. PATENT DOCUMENTS

| | | |
|---|---|---|
| 2015/0259809 A1 | 9/2015 | Hahn et al. |
| 2017/0279138 A1 | 9/2017 | Desjardins |
| 2019/0067719 A1 | 2/2019 | Rock |
| 2021/0273245 A1 | 9/2021 | Staeck |
| 2024/0145740 A1* | 5/2024 | Korn .................... B01D 63/085 |
| 2024/0145741 A1* | 5/2024 | Korn ................. H01M 8/04149 |
| 2024/0282988 A1* | 8/2024 | Voca ................. H01M 8/04149 |
| 2024/0291001 A1* | 8/2024 | Jainek .................... B01D 65/08 |

FOREIGN PATENT DOCUMENTS

| | | | |
|---|---|---|---|
| JP | 2008243418 A | 10/2008 | |
| WO | 9750139 A1 | 12/1997 | |
| WO | 11157377 A2 | 12/2011 | |
| WO | WO 2022047166 A1 * | 3/2022 | |

* cited by examiner

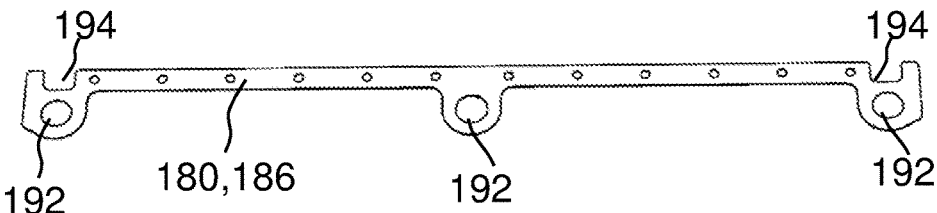
180,186
192          180,186          192          192
194          194
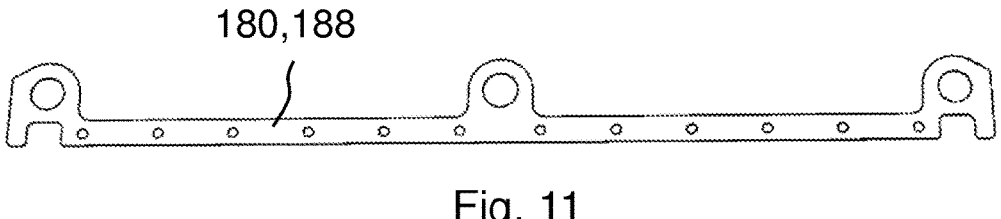
180,188
Fig. 11
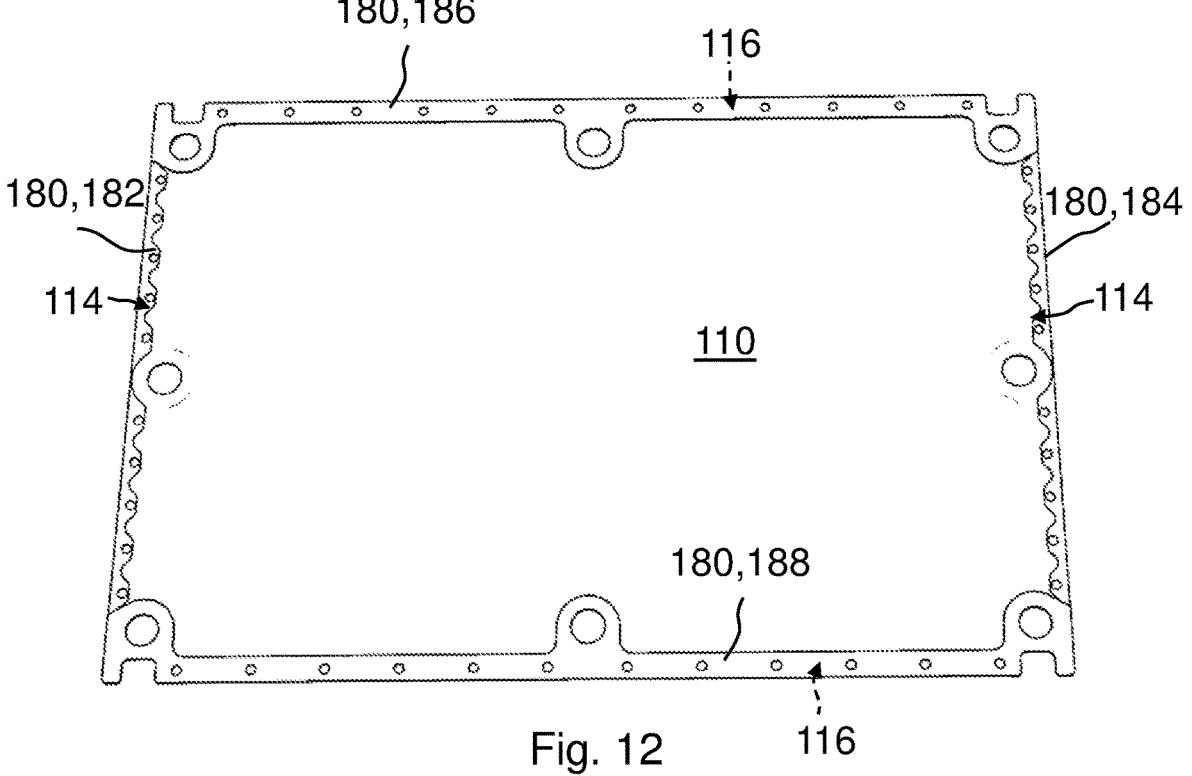
180,186          116
180,182          180,184
114          114
110
180,188
Fig. 12          116

STACK PLATE, STACK PLATE DEVICE AND HUMIDIFIER

CROSS-REFERENCE TO RELATED APPLICATIONS

This application claims the benefit of European Application No. 22210894.6 filed on Dec. 1, 2022, the entire disclosure of which is incorporated herein by reference for all purposes.

BACKGROUND

The invention relates to a stack plate for a stack plate device of a humidifier, in particular a humidifier for a fuel cell system, a stack plate device for a humidifier as well as a humidifier for a fuel cell system.

US2017279138 AA discloses a humidifier comprising a hollow shell and a humidifier core. The humidifier core includes a transfer sheet, a plurality of first channels, and a plurality of second channels. The transfer sheet comprises a permeable material having a plurality of sections and a plurality of layers of spacing materials. The plurality of first channels are configured to allow air flow in a first direction and to prevent airflow in a second direction that is different from the first direction. The plurality of second channels are configured to allow air flow in the second direction and to prevent airflow in the first direction. The humidifier comprises a stack of alternating first channels and second channels, and the first channels are configured to transfer liquid from air flowing in at least one of the first channels to air flowing in at least one of the second channels. The humidifier is suitable for use in fuel cell stack.

SUMMARY

It is an object of the invention to provide a cost-efficient stack plate for a stack plate device of a humidifier, in particular a humidifier for a fuel cell system.

Another object is to provide a cost-efficient stack plate device for a humidifier, in particular for a fuel cell system.

Another object is to provide a cost-efficient humidifier for a fuel cell system.

According to an aspect of the invention the object is achieved by a stack plate for a stack plate device of a humidifier, in particular a humidifier for a fuel cell system, the stack plate comprising a circumferential frame which encloses a through-opening in the stack plate, wherein a semipermeable layer completely covers the through-opening, the semipermeable layer being supported by at least one inlay part at least at two opposing front ends and/or at two opposing longitudinal ends, wherein an outer circumference of the semipermeable layer together with the at least one inlay part are embedded in the frame, wherein opposing front ends of the frame define inflow and outflow regions, respectively, on a first side of the frame for a second fluid and opposing longitudinal ends of the frame define inflow and outflow regions, respectively, on a second side of the frame for a first fluid.

According to a further aspect of the invention, the further object is achieved by a stack plate device for a humidifier, in particular for a fuel cell system, having a plurality of stack plates, the stack plates being stacked one atop of each other alternately in a stacking direction with first sides and second sides of adjacent stack plates facing first sides and second sides of adjacent stack plates facing second sides, and each stack plate comprising a peripheral frame which encloses a through-opening in the respective stack plate, wherein at least first and second groups of flow channels are formed in the stack plate device for fluid flow transversely to one another on both sides of the stack plates and being separated by semi-permeable layers, in particular moisture-permeable layers, wherein three of the alternatingly successive stack plates each form two of the flow channels, which are formed such that flow can pass through them transversely to one another.

According to a further aspect of the invention, the further object is achieved by a humidifier for a fuel cell system, comprising a housing which has at least one inlet for a first fluid, in particular an exhaust gas of the fuel cell system, an inlet for a second fluid, in particular a supply air of the fuel cell system, an outlet for the first fluid and an outlet for the second fluid, further comprising a stack plate device, in which a plurality of stack plates is arranged, the stack plates being stacked one atop of each other alternately in a stacking direction, with first sides of adjacent stack plates facing first sides and second sides of adjacent stack plates facing second sides, wherein three each of the alternately successive stack plates form a first and a second group of flow channels formed transversely to each other for flow of the first or second fluid therethrough, wherein the first group of flow channels are arranged between the inlet and the outlet for the first fluid and the second group of flow channels are arranged between the inlet and the outlet for the second fluid.

Advantageous embodiments are described in the dependent, the description and the drawings.

According to an aspect of the invention, a stack plate for a stack plate device of a humidifier, in particular a humidifier for a fuel cell system, is proposed, the stack plate comprising a circumferential frame which encloses a through-opening in the stack plate, wherein a semipermeable layer completely covers the through-opening, the semipermeable layer being supported by at least one inlay part at least at two opposing front ends and/or at two opposing longitudinal ends. An outer circumference of the semipermeable layer together with the at least one inlay part are embedded in the frame. Opposing front ends of the frame define inflow and outflow regions, respectively, on a first side of the frame for a second fluid and opposing longitudinal ends of the frame define inflow and outflow regions, respectively, on a second side of the frame for a first fluid.

The through-opening may be a single hole in the frame or may be a region with multiple breakthroughs.

The proposed stack plate advantageously serves for the construction of a stack plate device, which is advantageously suitable for a flat membrane humidifier. The fluid flow channels (exhaust gas and supply air channel) are formed by means of two stack plates and are used for the flow of moisture-laden exhaust gas, for example from a fuel cell, and dry supply air in the neighboring flow channel. The supply air can be humidified by moisture from the exhaust gas through the semipermeable layer.

The semipermeable layer thus separates the exhaust gas flow channel from the supply air flow channel. The semipermeable layer can be designed, for example, as a PFSA (perfluorosulfonic acid) membrane. Such membranes are also commonly used as proton exchange membranes. The membrane is airtight but permeable to moisture. The semipermeable layer can be overmolded, preferably together with inlay parts which support the semipermeable layer, and thus serve as a stable frame of the stack plate. The stack plates are assembled by stacking the frames of the stack plates over each other, preferably in a way where first sides of adjacent stack plates face first sides and second sides of adjacent stack plates face second sides.

The stack plates comprise the at least one inlay part as a carrier, the semipermeable layer and an overmold, e.g. from silicone. The inlay part may be from plastics, e.g. PPS (polyphenylene sulfide), with a small thickness of, e.g., 0.3 mm, or from stainless steel, e.g., for a stable support. The silicone overmolding seals the semipermeable layer and also seals the gas flow channels against each other. It is possible to mount specific grid-like support elements, e.g., with ribs to the stack plate which support the semipermeable layer and also regulate the fluid flow for optimized mass transfer between the fluid channels through the semipermeable layer. Geometric parameters such as height, lattice angle, spacing and the like of struts of the support elements can vary. In addition, a grid can be inserted in the supply air channel to further optimize the mass transfer through the semiperme-able layer. For cost optimization, the grid can be minimized or, if desired, completely omitted.

According to a favorable embodiment of the stack plate, the frame may comprise an overmolded portion of the outer circumference of the semipermeable layer together with the at least one inlay part. The silicone overmolding seals the semipermeable layer and also seals the gas flow channels to each other. The inlay parts stabilize the semipermeable layer as well as the overmold. The overmold itself forms a stable frame of the stack plate. The inlay part embedded in the overmold acts as a mechanical stabilizer for the frame of the stack plate.

According to a favorable embodiment of the stack plate, the longitudinal ends of the frame may have a first connect-ing region on the first side of the frame, in particular with a first sealing, for being connected to the first side of the frame of a stack plate adjacent in the stack plate device when being alternatingly stacked for intended use, wherein the front ends of the frame have second connecting region on the second side of the frame, in particular with a second sealing, for being connected to the second side of the frame of a stack plate adjacent in the stack plate device when being alternat-ingly stacked for intended use. Thus the stack plates may advantageously form the fluid flow channels when stacked alternatingly one after the other in a stacking direction for building the stack plate device.

According to a favorable embodiment of the stack plate, flow guiding elements may be arranged at the inflow and/or outflow regions, in particular at the inflow and/or outflow regions for the second fluid. By this way steady flow conditions may be established for optimized humidity trans-fer from the exhaust gas to the supply air.

According to a favorable embodiment of the stack plate, the stack plate may further comprise a grid-like support element on the first side and/or the second side of the frame. The grid-like support elements with ribs may be arranged on the stack plate and may support the semipermeable layer and also regulate the fluid flow for optimized mass transfer through the semipermeable layer. Height, angle and spacing of struts of the grid-like support element can vary if neces-sary. The grid-like support element may be made from plastics, e.g. PPS, or from stainless steel, e.g., for a stable support. The grid-like support element can be attached to the frame of the stack plate in a shape adapted to the frame.

According to a favorable embodiment of the stack plate, the at least one inlay part may comprise two inlay stripes being integrated into the frame at each of the opposing front ends of the frame or at each of the longitudinal ends of the frame, in particular being overmolded at the front ends of the frame or at the longitudinal ends of the frame. Thus, the semipermeable layer may advantageously be supported and stabilized against bending by the inlay stripes on both front ends in order to have stable support for the connection regions when the adjacent stack plates are stacked together. Favorably, the overmolded frame can be used as a stable seal.

According to a favorable embodiment of the stack plate, the at least one inlay part may comprise two first inlay stripes being integrated into the frame at each of the front ends of the frame and two second inlay stripes at each of the longitudinal ends of the frame, wherein the semipermeable layer may be inserted between the first two inlay stripes and the second two inlay stripes. The outer circumference of the semipermeable layer together with the first two inlay stripes and the second two inlay stripes may be overmolded in order to form the frame. In this further embodiment the semiper-meable layer is supported by additional inlay stripes on the longitudinal sides thus forming a frame on all four sides for being overmolded. By this way after overmolding the frame exhibits enhanced strength and stability.

According to a favorable embodiment of the stack plate, the at least one inlay part may comprise a plate supporting the semipermeable layer, in particular wherein the plate is configured as a grid-like support element. This embodiment delivers a stable support for the semipermeable layer over the whole opening of the stack plate and additionally may be provided with ribs or struts for optimized transfer of the humidity from the exhaust gas to the supply air.

According to a favorable embodiment of the stack plate, the plate may be configured with ribs, in particular with L-and/or U-shaped ribs, aligned in an oblique manner to a flow direction of the first and/or second fluid. Thus the grid-like support element may additionally be provided with L-and/or U-shaped ribs for optimized transfer of the humidity from the exhaust gas to the supply air. By this way, the fluid flow may be effected in a particularly advantageous way for humidity transfer through the semipermeable layer.

According to a further aspect of the invention, a stack plate device for a humidifier, in particular for a fuel cell system, is proposed, comprising a plurality of stack plates, the stack plates being stacked one atop of each other alternately in a stacking direction with first sides of adjacent stack plates facing first sides and second sides of adjacent stack plates facing second sides and each stack plate com-prising a peripheral frame which encloses a through-opening in the stack plate. At least first and second groups of flow channels are formed in the stack plate device, for fluid flow transversely to one another on the sides of the stack plates and being separated by semi-permeable layers, in particular moisture-permeable layers, wherein three of the alternat-ingly successive stack plates each form two of the flow channels, which are formed such that flow can pass through them transversely to one another.

The proposed stack plate device may advantageously be suitable for humidifiers, in particular for fuel cell systems. The fluid flow channels (exhaust gas and supply air channel) advantageously are formed by means of two stack plates, which are stacked alternately with the first sides facing each other or with the second sides facing each other, and are used for the flow of moisture-laden exhaust gas, for example from a fuel cell, and dry supply air in the neighboring flow channel. The supply air can be humidified by moisture from the exhaust gas through the semipermeable layer.

The semipermeable layer of the stack plate thus separates the exhaust gas flow channel from the supply air flow channel. The semipermeable layer can be designed, for example, as a PFSA (perfluorosulfonic acid) membrane. Such membranes are also commonly used as proton exchange membranes. The membrane is airtight but permeable to moisture. The semi-permeable layer can preferably together with inlay parts, which support the semipermeable layer, be overmolded as a frame of the stack plate. The stack plates are assembled by stacking the frames of the stack plates over each other. The frames of the stack plates may serve as stable seals.

According to a favorable embodiment of the stack plate device, the stack plates may comprise a grid-like support element spanning the through-opening in the respective stack plate.

Separate grid-like support elements in the form of flow grids may be inserted between the stack plates. As a result, the fluid flow zigzags through the cross-rib structure of the flow grid. This targeted flow manipulation can achieve better mass transfer, in particular better moisture transfer, from the moist exhaust gas to the dry supply air, thereby increasing the performance of the humidification system. The type of grille, in particular the height of struts forming the grille, the crossing angle of the struts, the spacing of the struts ("filament spacing") from one another, can be used to specifically influence the mass transfer and the pressure drop.

The grid on the exhaust side also serves as a spacer for the semipermeable layers, which are designed as membranes, and prevents collapse of the flow channel due to a differential pressure between the exhaust gas and the supply air, which is forced into the associated flow channel at a higher pressure. The differential pressure between the supply air and the exhaust gas can usually be in the range of 300 mbar to 600 mbar and even up to 1 bar. Such a humidification device is particularly advantageously suited for a fuel cell system.

The grid-like support element can preferably be formed from plastic, for example PA6.6 (polyamide), PPA (polyphtalamide), PPS (polyphenylene sulfide), or TPX (polymethylpentene).

Favorably, the grid-like support element may be arranged on the first side or on the second side of the stack plate. Alternatively, the grid-like support element can also be provided in both flow channels for the exhaust gas and the supply air flow. In this way, an even better mass transfer through the semipermeable layer can be achieved. In addition, the semipermeable layers are thus even better supported and held in position.

According to a favorable embodiment of the stack plate device, the grid-like support elements on the first side of the stack plates may be formed differently from those on the second sides of the stack plates. In particular, the grid-like support elements on the first sides may differ in height and/or thread spacing and/or crossing angle of struts in the support elements. In this way, an optimized mass transfer through the semipermeable layer can be achieved.

According to a favorable embodiment of the stack plate device, successive stack plates may be connected to one another in a fluid-tight manner except for inflow or outflow regions between the stack plates, in particular are connected to one another at the frames of the stack plates. In particular, successive stack plates may be bonded to one another. By this way, the flow channels may advantageously be sealed one against each other in the frame region in order to guarantee steady flow conditions for the exhaust gas and the supply air. Favorable humidity transfer through the semipermeable layer may be provided.

According to a favorable embodiment of the stack plate device, at least one receptacle for an axial or radial gasket may be arranged on an outer side of the stack plate device. In particular, the frames of the successive stack plates may comprise incisions by means of which the receptacle is formed in the stacked stack plates. By means of such a seal, the stack plate device can advantageously be arranged in the housing of a humidifier in such a way that no bypass flow of the two fluid streams can occur around the plate stack. In this way, efficient humidification of the supply air can be achieved by transferring the moisture from the exhaust gas flow.

According to a further aspect of the invention, a humidifier for a fuel cell system is proposed, comprising a housing which has at least one inlet for a first fluid, in particular an exhaust gas of the fuel cell system, an inlet for a second fluid, in particular a supply air of the fuel cell system, an outlet for the first fluid and an outlet for the second fluid. The humidifier further comprises a stack plate device, in which a plurality of stack plates is arranged, the stack plates being stacked one atop of each other alternately in a stacking direction, with first sides of adjacent stack plates facing first sides and second sides of adjacent stack plates facing second sides. Three each of the alternately successive stack plates form a first and a second group of flow channels formed transversely to each other for flow of the first or second fluid therethrough. The first group of flow channels are arranged between the inlet and the outlet for the first fluid and the second group of flow channels are arranged between the inlet and the outlet for the second fluid.

The humidifier represents a special embodiment of a flat membrane humidifier. A first moist or water-rich fluid, for example exhaust gas from fuel cells, flows in one group of flow channels, while a second, dry fluid, for example supply air for the fuel cells, flows in another group of flow channels. The second, dry fluid can be moistened by the first fluid via the semipermeable membranes.

The stack plate device with the stack plates can, for example, be axially floatingly sealed in the housing via two axially acting seals located respectively at the ends on the inlet side and outlet side of the first or second fluid. These seals can seal either the supply air area or the exhaust gas area. Preferably, the exhaust gas area is sealed.

The housing of the humidifier can be made of metal, for example aluminum. Alternatively, it is also possible that the housing is made of plastics, for example PPS, PPA (polyphtalamide), PA (polyamide).

The housing can be made in several parts with a removable cover. In this way, the stack plate device can be removed from the housing for maintenance purposes and/or be replaced.

BRIEF DESCRIPTION OF DRAWINGS

The present invention together with the above-mentioned and other objects and advantages may best be understood from the following detailed description of the embodiments, but not restricted to the embodiments.

FIG. 11 shows two longitudinal inlay stripes as inlay parts for a stack plate according to a further embodiment of the invention, in an isometric view.

FIG. 12 shows a semipermeable layer stacked between two short inlay stripes and two longitudinal inlay stripes.

DETAILED DESCRIPTION

Figure 1:
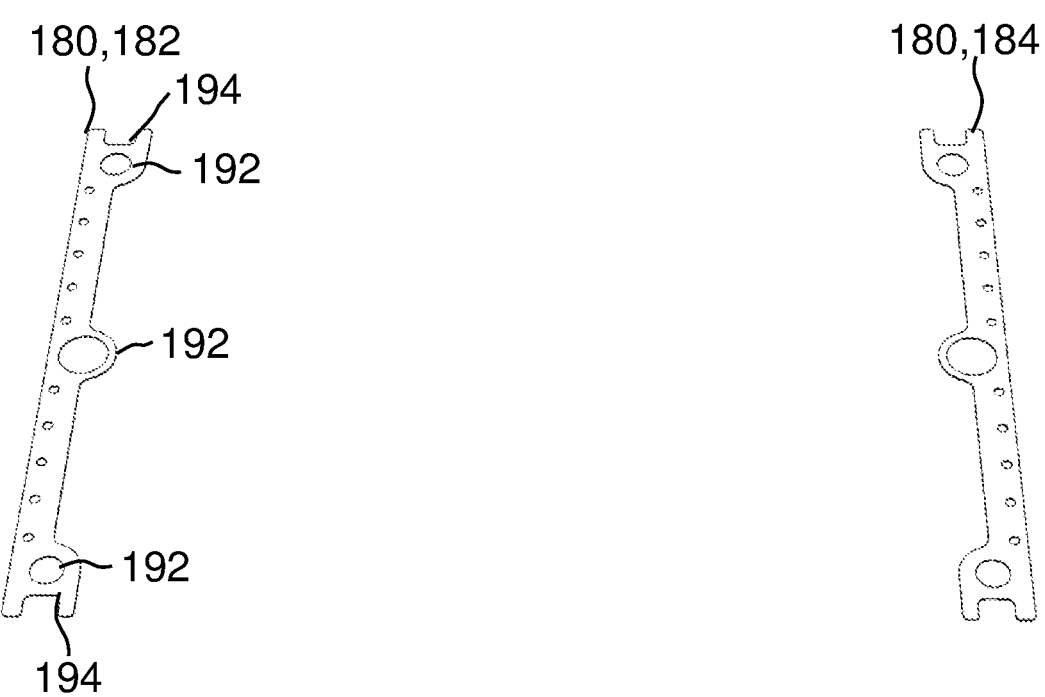
FIG. 1 shows two inlay stripes as inlay parts for a stack plate according to an embodiment of the invention, in an isometric view.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The proposed stack plate 100 for a stack plate device 400 of a humidifier 1000, in particular a humidifier 1000 for a fuel cell system, comprises a circumferential frame 120 which encloses a through-opening 130. Such a stack plate 100 according to an embodiment of the invention is depicted in FIG. 3.

A semipermeable layer 110 completely covers the through-opening 130. The through-opening 130 is a single hole in the stack plate 100. The semipermeable layer 110 is supported by at least one inlay part 180 at least at two opposing front ends 114 and/or at two opposing longitudinal ends 116.

Figure 2:
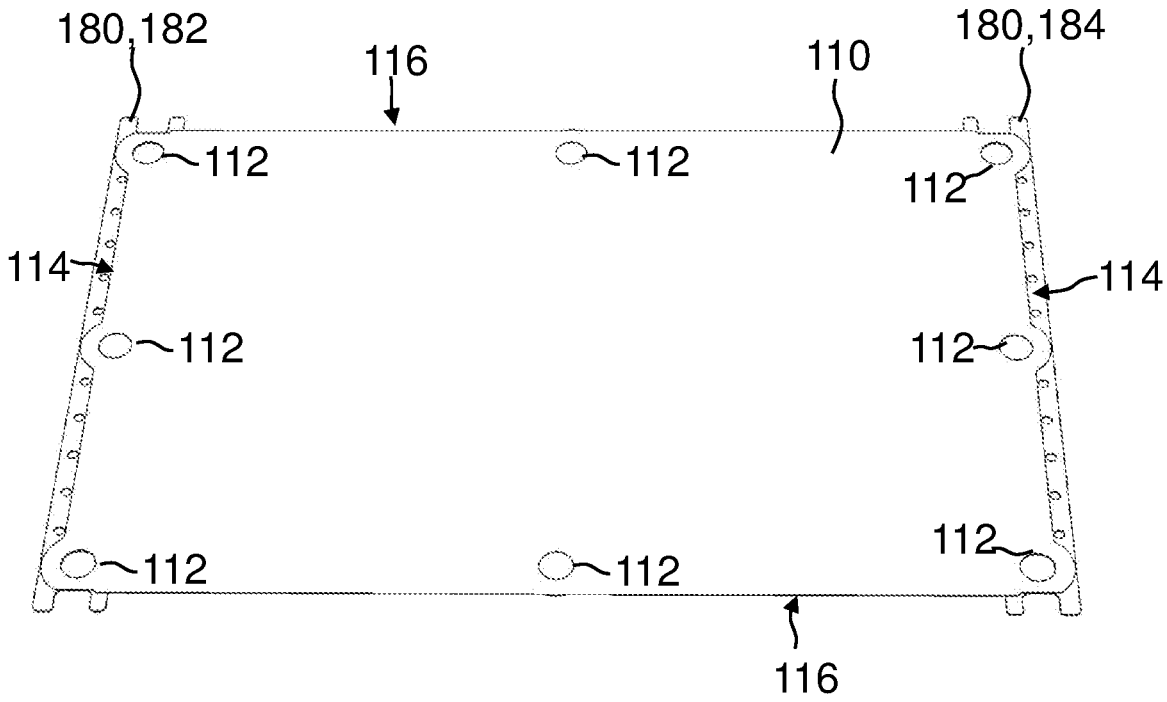
FIG. 2 shows the inlay parts according to FIG. 1 with a semipermeable layer on top.

FIG. 1 depicts two inlay stripes 182 as inlay parts 180 for the stack plate 100, whereas in FIG. 2 the inlay parts 180 according to FIG. 1 with a semipermeable layer 110 on top are shown. The inlay stripes 182, 184 are provided with holes 192 and incisions 194 for a final assembly in a stack plate device 400. The semipermeable layer 110, which is shown in FIG. 2 on top of the inlay stripes 182, 184, also is provided with holes 112 being congruent with the holes 192 of the inlay stripes 182, 184.

Figure 3:
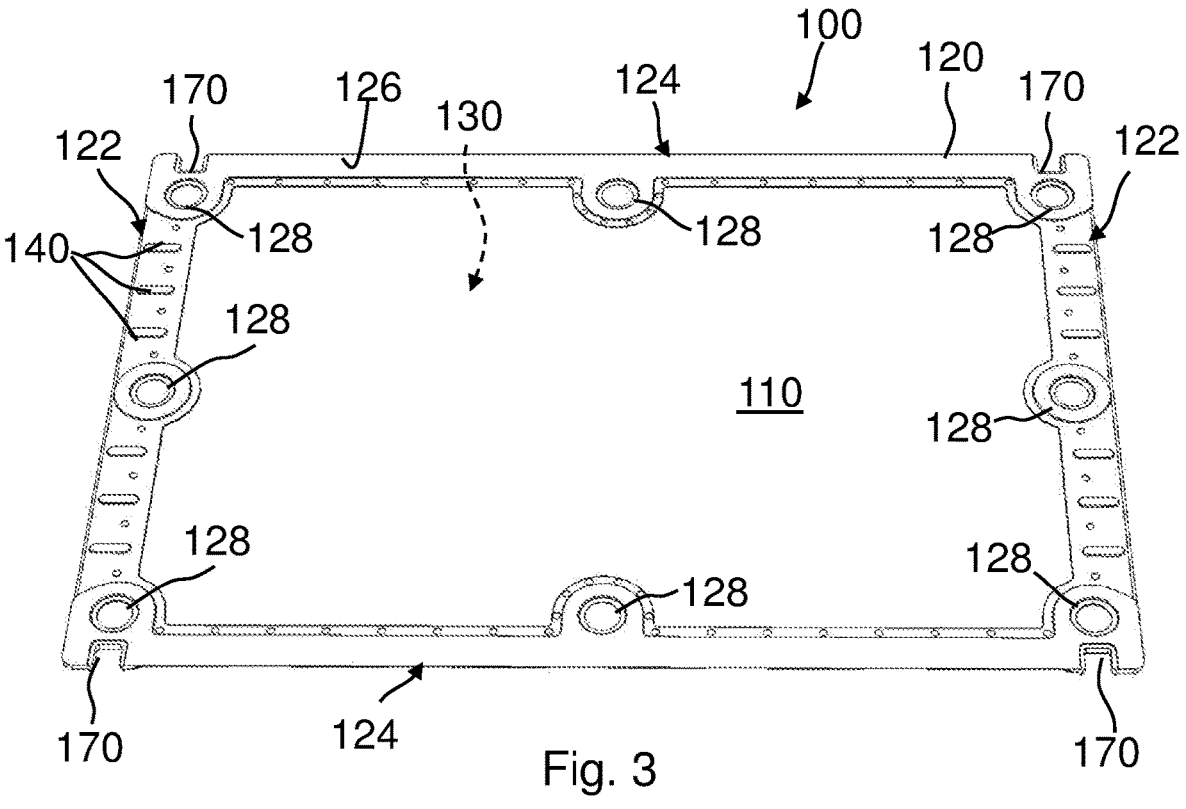
FIG. 3 shows a stack plate for a stack plate device of a humidifier, in particular a humidifier for a fuel cell system, according to an embodiment of the invention with a frame made by overmolding, in an isometric view.

As can be seen with the stack plate 100 in FIG. 3, an outer circumference of the semipermeable layer 110 together with the at least one inlay part 180 are embedded in the frame 120. Opposing front ends 122 of the frame 120 define inflow and outflow regions 210, 212, respectively, on a first side 126 of the frame 120 for a second fluid 602 (FIG. 5) and opposing longitudinal ends 124 of the frame 120 define inflow and outflow regions 220, 222, respectively, on a second side 125 of the frame 120 for a first fluid 600 (FIG. 6).

The frame 120 comprises an overmolded portion of the outer circumference of the semipermeable layer 110 together with the inlay parts 180. Holes 128 and incisions 170 for assembly of the stack plate 100 in a stack plate device 400 are provided in the overmolded portion.

The two inlay stripes 182, 184 may be integrated into the frame 120 at the front ends 122 of the frame 120, depicted in the embodiment shown in FIG. 2, or at the longitudinal ends 124 of the frame 120. In particular, the two inlay stripes 182, 184 may be overmolded at the front ends 122 of the frame 120 or at the longitudinal ends 124 of the frame 120.

Figure 4:
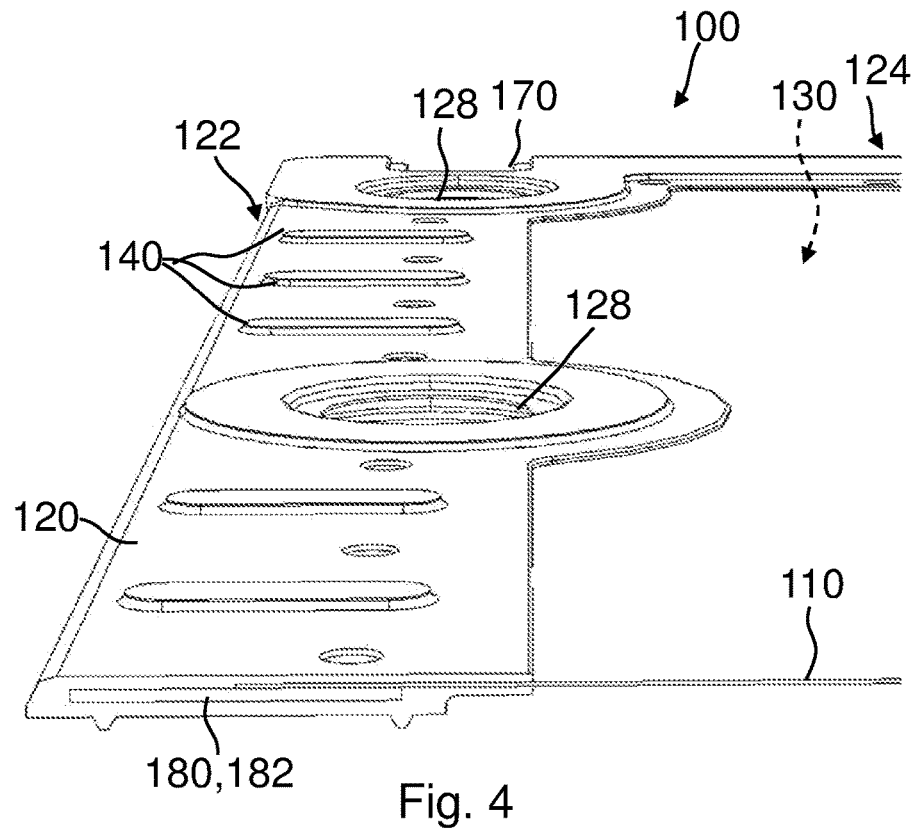
FIG. 4 shows a cut view through the stack plate according to FIG. 3.

In FIG. 4 a cut view through the stack plate 100 according to FIG. 3 is depicted. In the cut view the inlay stripe 182 supporting the semipermeable layer 110 is to be seen embedded in the overmolded portion of the frame 120. Also flow guiding elements 140, in particular for the second fluid flow 602, as to be seen in FIG. 5, are formed in the overmolded portion of the frame 120.

Figure 5:
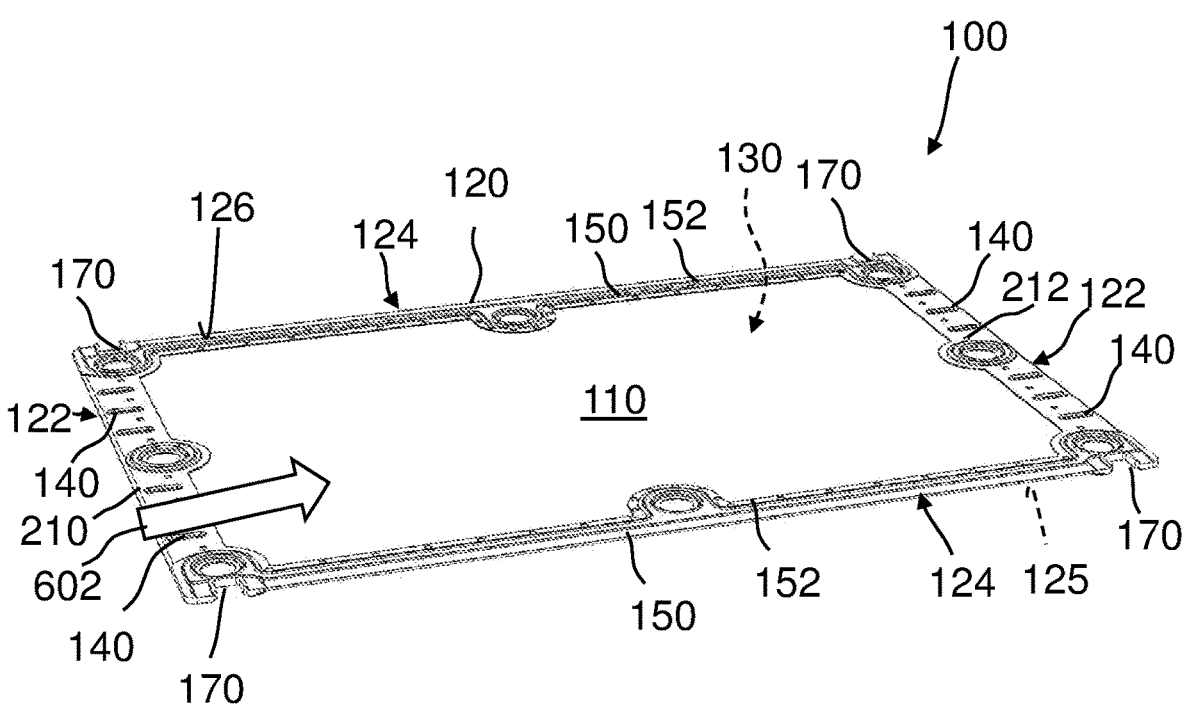
FIG. 5 shows the stack plate according to FIG. 3 from a first side with a flow direction of a second fluid.
Figure 6:
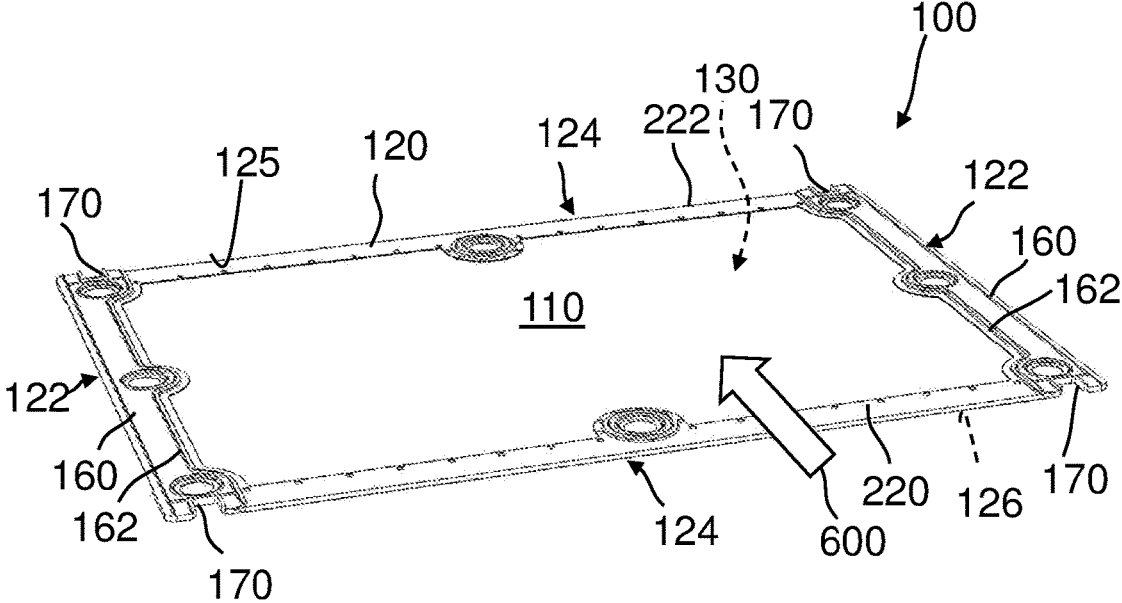
FIG. 6 shows the stack plate according to FIG. 3 from a second side with a flow direction of a first fluid.

FIG. 5 depicts the stack plate 100 according to FIG. 3 from a first side 126, the top side, with a flow direction of a second fluid 602.

Along the first side 126 of the stack plate 100, the second fluid 602, e.g. the supply air, enters the stack plate 100 through the inflow region 210 at the front end 122, traverses the semipermeable layer 110 over the through-opening 130 in the stack plate 100 and leaves the stack plate 100 via the outflow region 212 at the opposing front end 122.

Flow guiding elements 140 for the second fluid 602 are arranged at the inflow and/or outflow regions 210, 212 of the frame 120.

The longitudinal ends 124 of the frame 120 have a first connecting region 150 on the first side 126 of the frame 120, in particular with a first sealing 152, for being connected to the first side 126 of the frame 120 of a stack plate 100 adjacent in the stack plate device 400 when being alternatingly stacked for intended use. The sealing 152 may be integral with the overmolded frame 120.

In FIG. 6 the stack plate is depicted from a second side 125, the bottom side, with a flow direction of a first fluid 600.

At the second side 125 of the stack plate 100, the first fluid 600, e.g. the exhaust gas, enters the stack plate 100 through the inflow region 220 at the longitudinal end 124, traverses the semipermeable layer 110 over the through-opening 130 and leaves the stack plate 100 via the outflow region 222 at the opposing longitudinal end 124.

The front ends 122 of the frame 120 have second connecting region 160 on the second side 125 of the frame 120, in particular with a second sealing 162, for being connected to the second side 125 of the frame 120 of a stack plate 100 adjacent in the stack plate device 400 when being alternatingly stacked for intended use. The sealing 162 may be integral with the overmolded frame 120.

Figure 7:
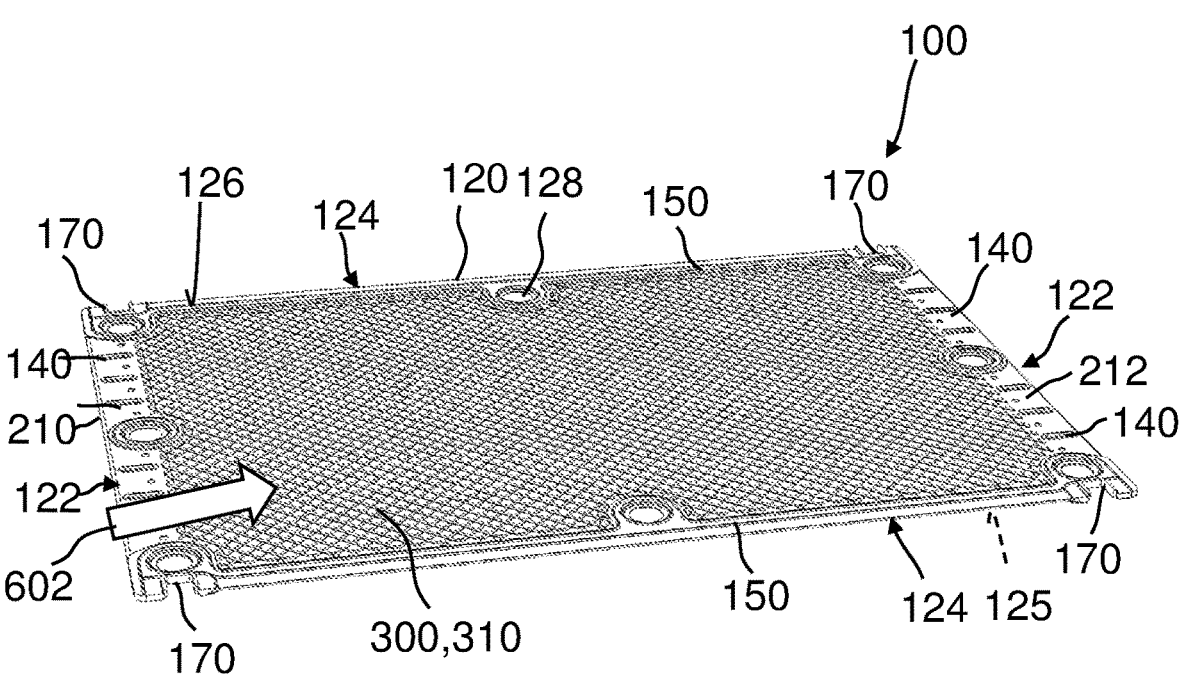
FIG. 7 shows the stack plate according to FIG. 3 from the first side with a grid-like support element placed on the plate.
Figure 8:
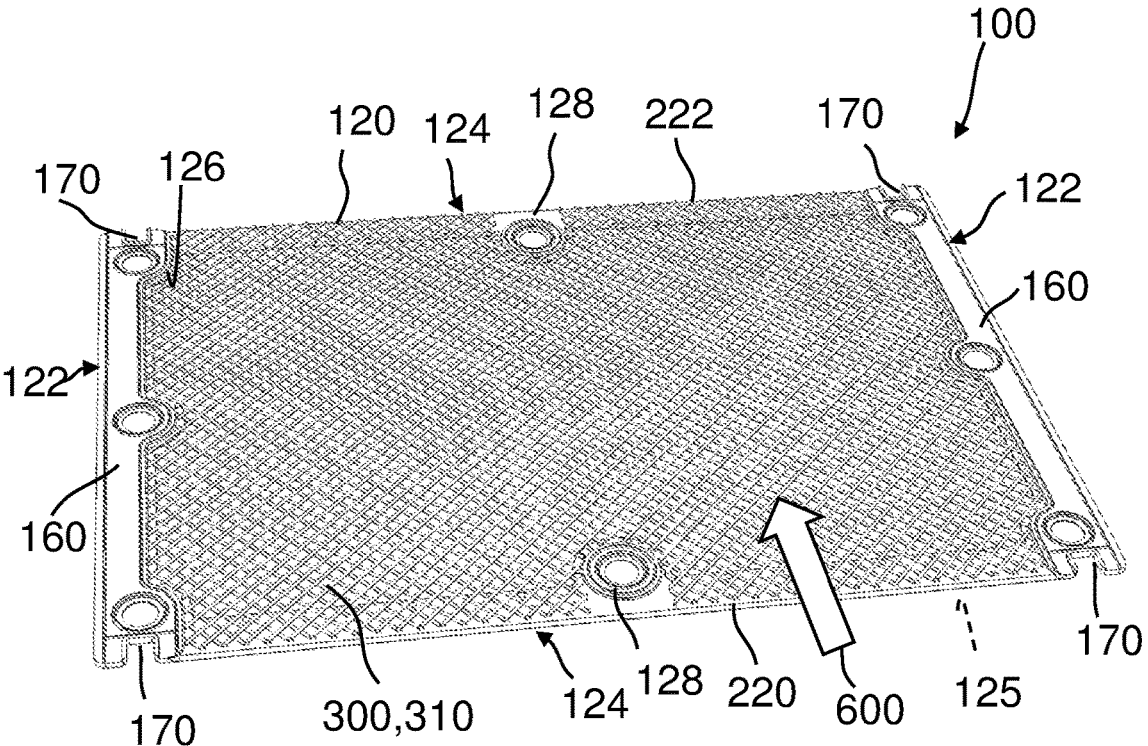
FIG. 8 shows the stack plate according to FIG. 3 from the second side with a grid-like support element placed on the plate.

FIG. 7 depicts the stack plate 100 according to FIG. 3 from the first side 126 with a grid-like support element 300 placed on the semipermeable layer 110 on the first side 126, whereas in FIG. 8 the stack plate 100 is shown from the second side 125 with an overlaid grid-like support element 300 placed on the semipermeable layer 110 on the second side 125.

The grid-like support elements 300 with struts or ribs 310 may be arranged on the stack plate 100 to support the semipermeable layer 110 and also regulate the fluid flow for optimized mass transfer of the moisture from the exhaust gas flow. Height, angle and spacing of the struts can be varied. The grid-like support element 300 can be attached to the frame 120 of the stack plate 100 in a shape adapted to the frame 120, in particular with recesses where mounting holes 128 are arranged in the stack plate 100.

Figure 9:
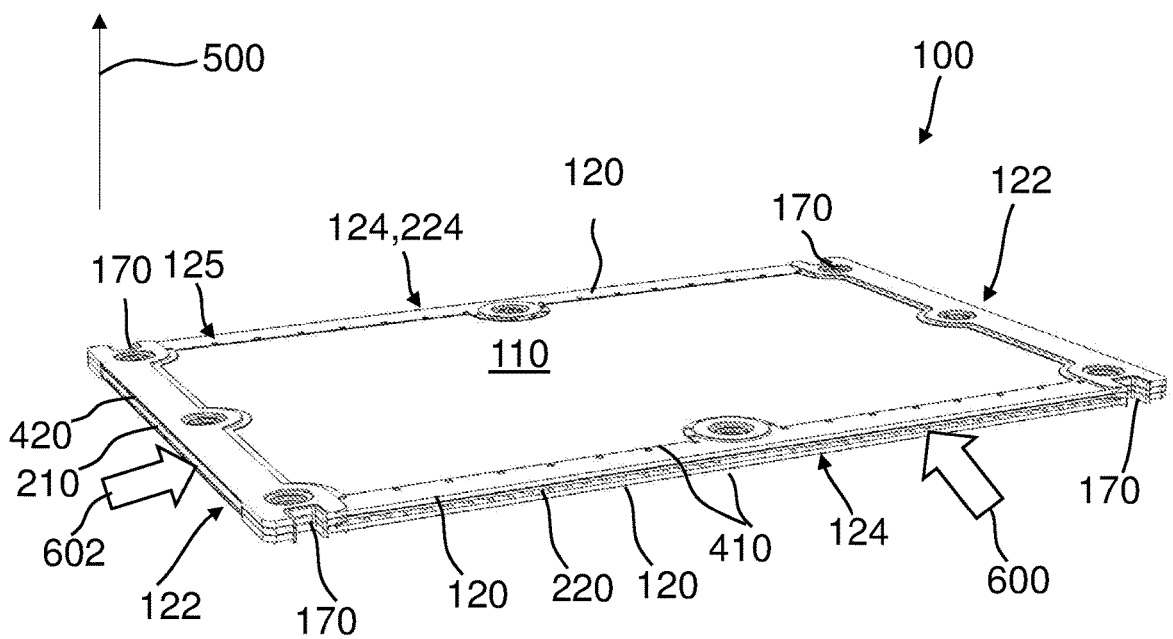
FIG. 9 shows three alternately stacked successive stack plates forming flow channels for the first and second fluid.
Figure 10:
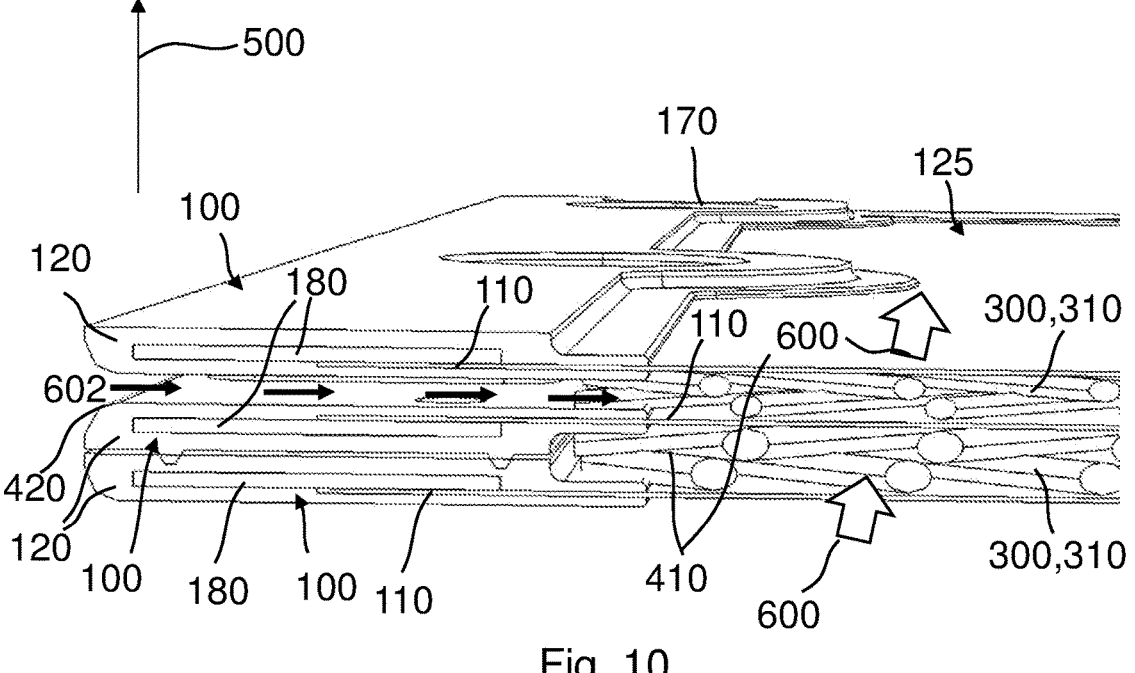
FIG. 10 shows a cut view through the three alternatingly successive stack plates forming flow channels for the first and second fluid of FIG. 9.

FIG. 9 depicts an arrangement comprising three successive stack plates 100 forming flow channels 410, 420 for the first and second fluid 600, 602. FIG. 10 depicts a cut view through the three alternatingly successive stack plates 100.

As is particularly to be seen in the cut view, the medium stack plate 100 is positioned with the first side 126 in the stacking direction 500 as shown in the previous Figures. The upper stack plate 100 and the lower stack plate 100 are positioned upside down with their second sides 125 at the outside of the arrangement of the three successive stack plates 100. This may be distinguished from the position of the semipermeable layer 110 relative to the inlay part 180 of the frame 120.

Thus the flow channel 420 with the second fluid 602, e.g. the supply air, is directed from left to right, indicated by the black arrows pointing from left to right in the Figure, between the upper most stack plate 100 and the medium stack plate 100.

Flow channels 410 with the first fluid 600, e.g. the exhaust gas, are directed into the picture plane, indicated by the arrows pointing from the front to the back in the Figure, above the upper most stack plate 100 and between the lowest stack plate 100 and the medium stack plate 100.

In the flow channels 410, 420 grid-like elements 300 are positioned in order to influence the fluid flow for better moisture transfer as well as in order to support the semipermeable layer 110.

FIGS. 11 to 16 depict a further embodiment of the stack plate 100.

FIG. 11 depicts two longitudinal inlay stripes 186, 188 as inlay parts 180 for a stack plate 100 according to the further embodiment of the invention, in isometric view. In FIG. 12 a semipermeable layer 110 is then stacked between two short inlay stripes 182, 184 and two longitudinal inlay stripes 186, 188.

Figure 13:
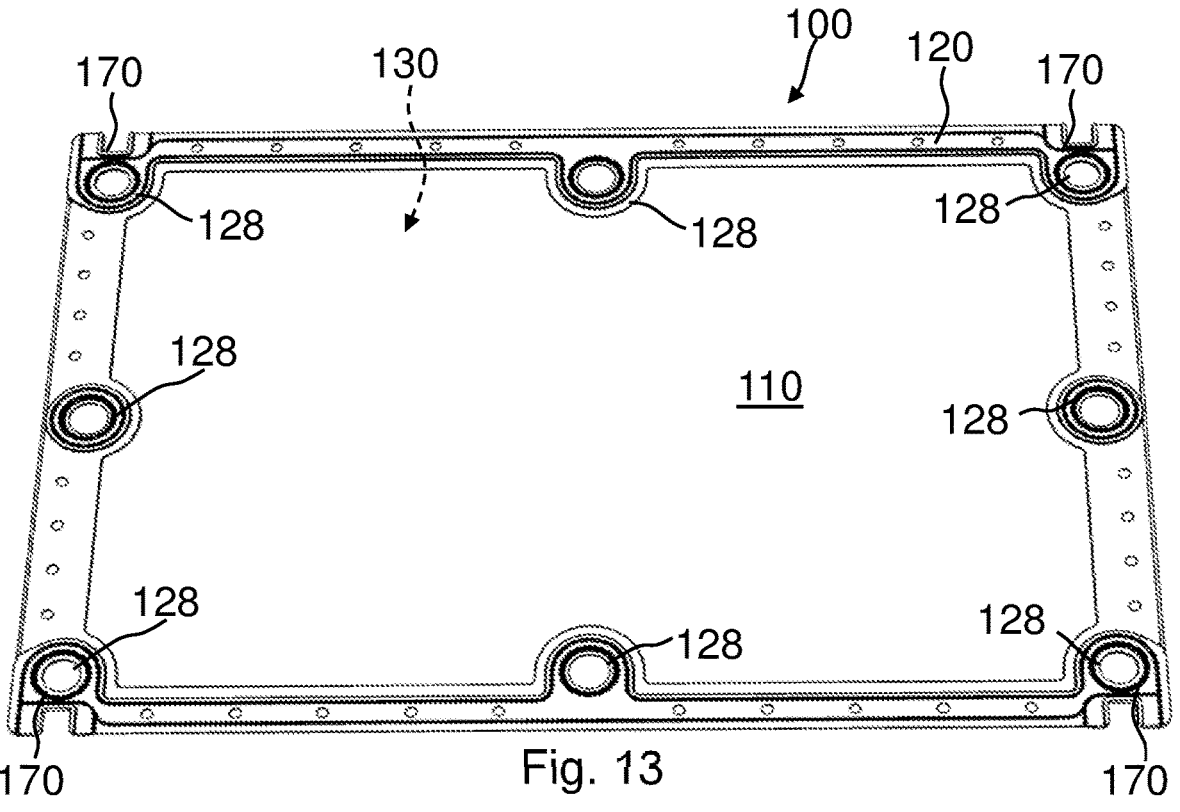
FIG. 13 shows a stack plate according to a further embodiment of the invention, with the semipermeable layer stacked between two short inlay stripes and two longitudinal inlay stripes, in an isometric view.

FIG. 13 depicts a stack plate 100 according to the further embodiment of the invention, with the semipermeable layer 110 stacked between two short inlay stripes 182, 184 and two longitudinal inlay stripes 186, 188, in isometric view.

The inlay parts 180 for the embodiment shown comprise two first inlay stripes 182, 184 being integrated into the frame 120 at the front ends 122 of the frame 120 and two second inlay stripes 186, 188 at the longitudinal ends 124 of the frame 120. The semipermeable layer 110 is inserted between the first two inlay stripes 182, 184 and the second two inlay stripes 186, 188. The outer circumference of the semipermeable layer 110 together with the first two inlay stripes 182, 184 and the second two inlay stripes 186, 188 are then overmolded in order to form the frame 120.

Several mounting holes 128 for assembling the stack plate 100 are provided in the frame 120.

Figure 14:
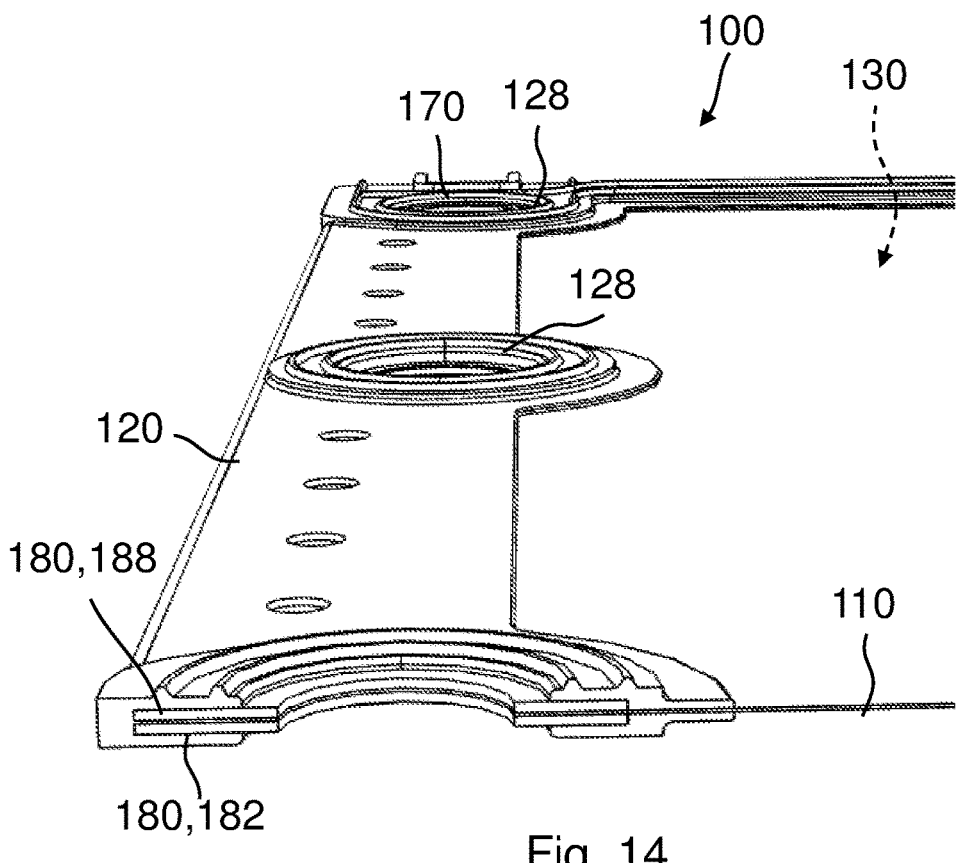
FIG. 14 shows a cut view through the stack plate according to FIG. 13.

FIG. 14 depicts a cut view through the stack plate 100 according to FIG. 13. In the cut view of corner of the frame 120 the overlay of the short inlay stripe 182, the semipermeable layer 110 and the longitudinal inlay stripe 188 are to be seen.

Figure 15:
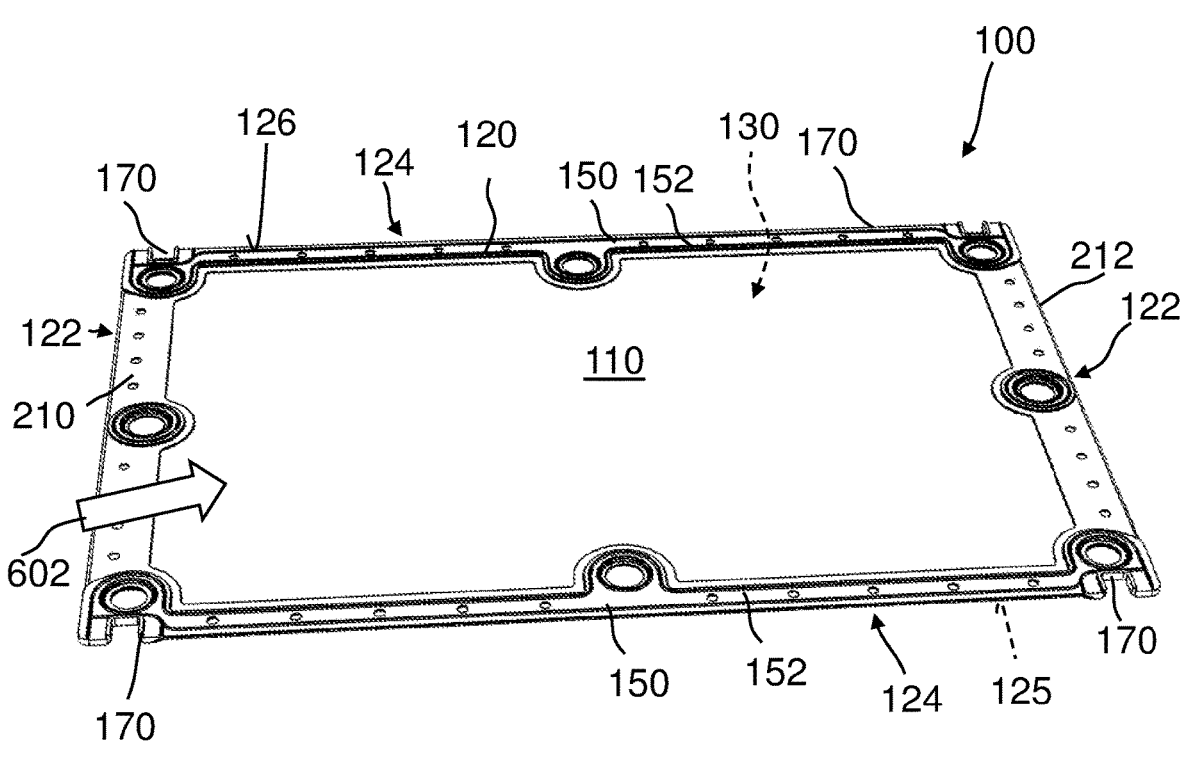
FIG. 15 shows the stack plate according to FIG. 13 from a first side with a flow direction of a second fluid.
Figure 16:
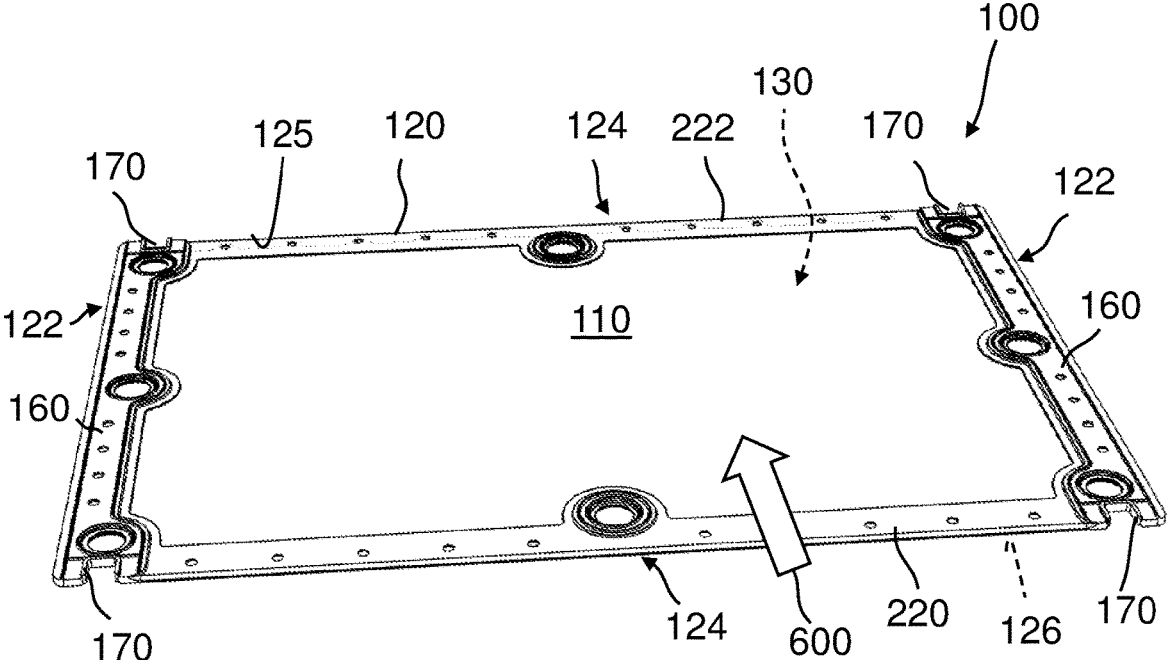
FIG. 16 shows the stack plate according to FIG. 13 from a second side with a flow direction of a first fluid.

FIG. 15 depicts the stack plate 100 according to FIG. 13 from the first side 126 with a flow direction of a second fluid 602, whereas in FIG. 16 the stack plate 100 is depicted from the second side 125 with a flow direction of a first fluid 600.

The outer appearance and the functions of the stack plate 100 are quite the same as with the embodiment of a stack plate 100 shown in FIGS. 5 and 6, except that flow guide elements 140 are not provided on the inflow and outflow regions 210, 212. The difference, which is not to be seen, is that the stack plate 100 of FIGS. 15 and 16 exhibits additional stability of the frame 120 due to the longitudinal inlay stripes 186, 188 embedded in the frame 120.

A further embodiment of a stack plate 100 is depicted in FIGS. 17 to 20.

In this embodiment, the at least one inlay part 180 comprises a plate 190 supporting the semipermeable layer 110. In particular, the plate 190 may be configured as a grid-like support element 300.

Figures 17, 18:
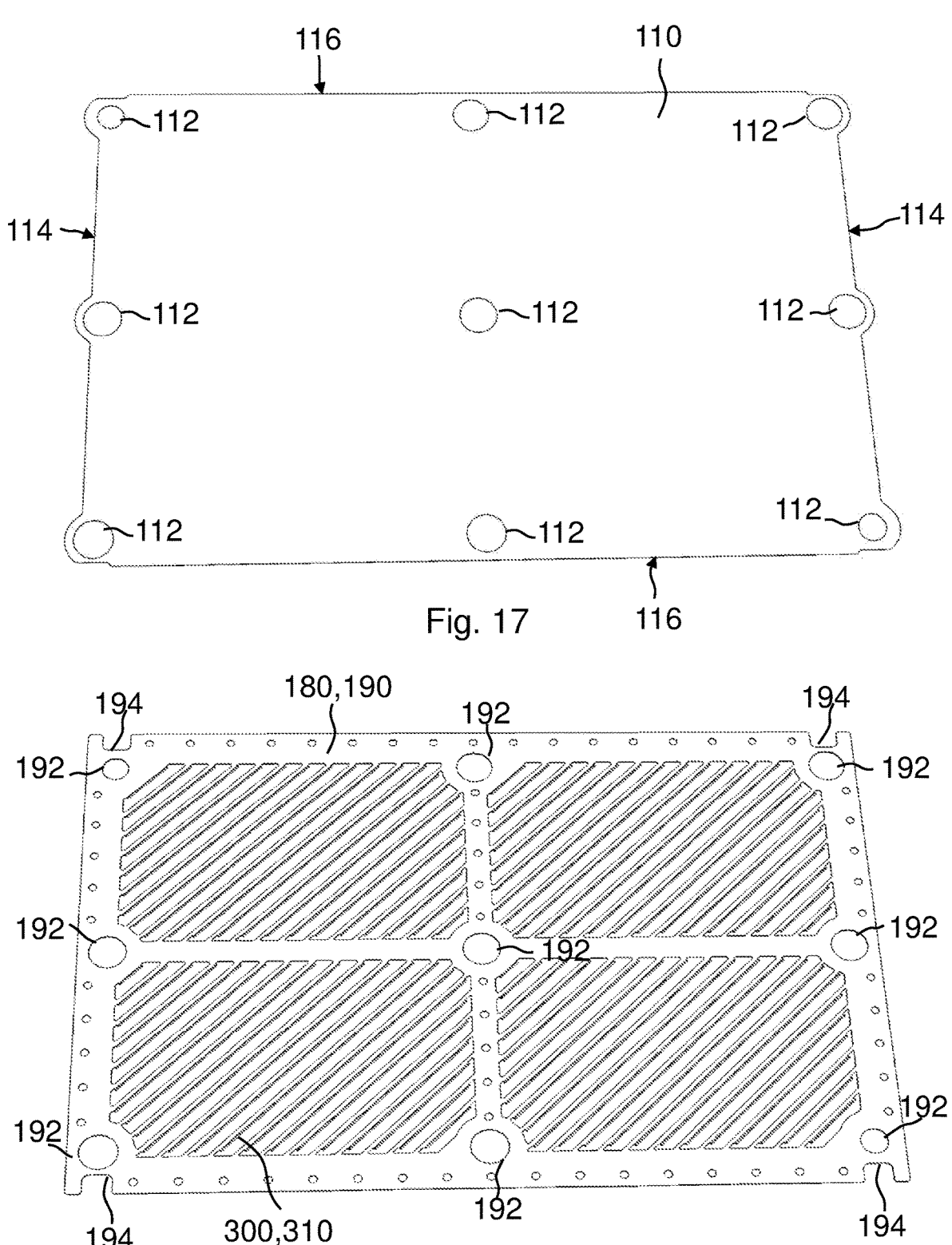
FIG. 17 shows a semipermeable layer in an isometric view.
FIG. 18 shows a plate as an inlay part according to a further embodiment of the invention, in an isometric view.

FIG. 17 depicts the semipermeable layer 110 with holes 112 for assembly in isometric view. FIG. 18 depicts the plate 190 as an inlay part 180, in isometric view.

The plate 190 may be configured with ribs 310, in particular with L- and/or U-shaped ribs 310, aligned in an oblique manner to a flow direction of the first and/or second fluid 600, 602. The plate 190 is also provided with holes 192 and incisions 194 for assembly in a stack plate device 400.

Figures 19, 20:
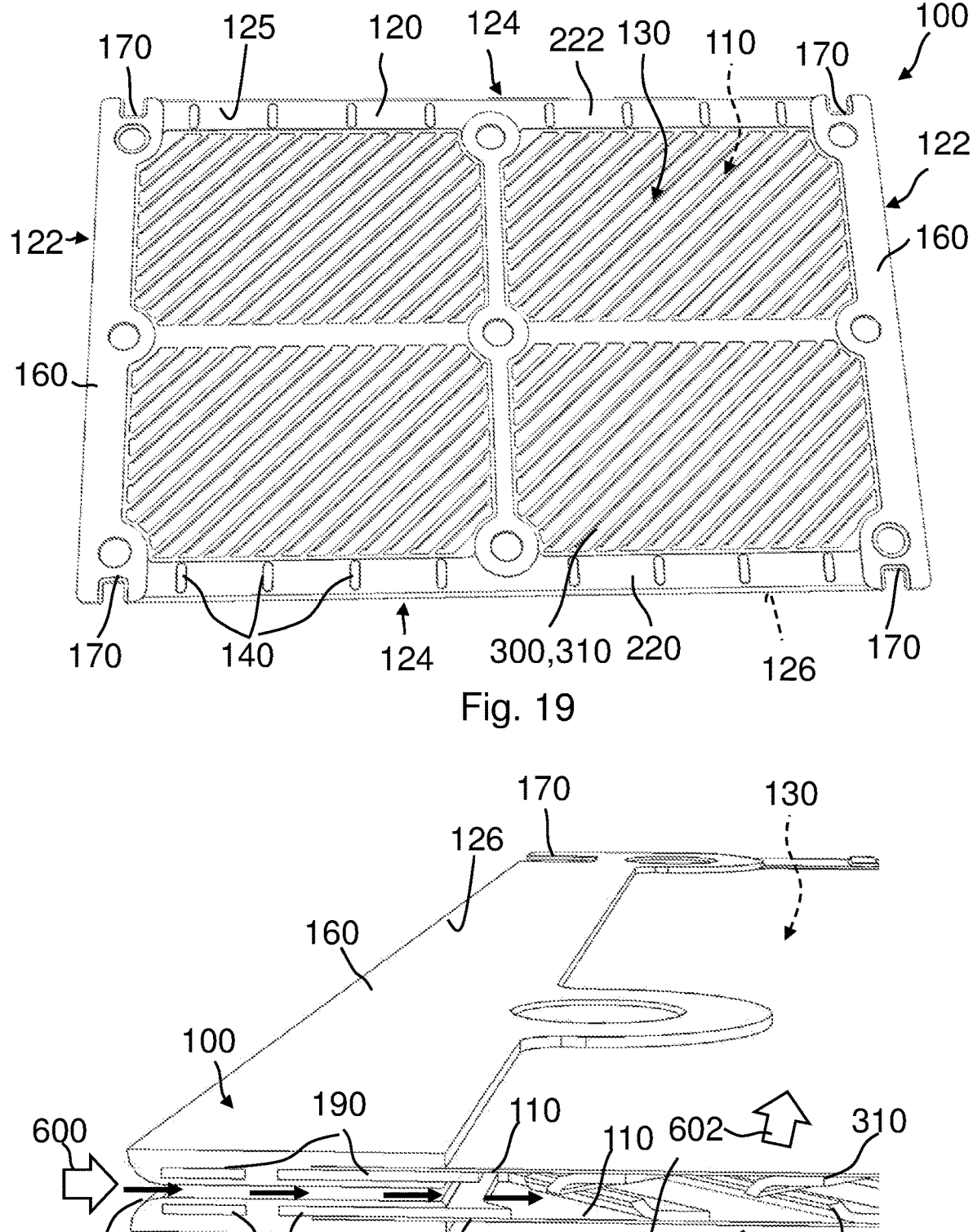
FIG. 19 shows a stack plate according to a further embodiment of the invention, with the plate as an inlay part, in an isometric view.
FIG. 20 shows a cut view through two alternately stacked stack plates according to FIG. 19.

FIG. 19 depicts the stack plate 100 with the plate 190 as an inlay part 180, in isometric view. The stack plate 100 is shown from the second side 125. In this embodiment the inflow region 220 and outflow region 222 are provided with flow guiding elements 140 for a steady flow of the first fluid 600, e.g. the exhaust gas. The through-opening 130 in the stack plate 100 is a region with multiple breakthroughs.

In FIG. 20 a cut view through two alternatingly stacked stack plates 100 according to FIG. 19 is depicted.

The stack plates 100 are stacked with the second sides 125 joined together. So there is a flow channel 410 for the first fluid 600 between the stack plates 100 where the grid-like element 300 of the plate 190 may also influence the flow of the first fluid 600. The flow channel 420 for the second fluid 602, e.g. the supply air, is below the lower stack plate 100 and above the upper stack plate 100 perpendicular to the flow channel 410 of the first fluid 600.

As is to be seen in the cut view, the ribs 310 of the grid-like element 300, are particularly L- and/or U-shaped ribs 310, aligned in an oblique manner to a flow direction of the first fluid 600.

Figures 21, 22:
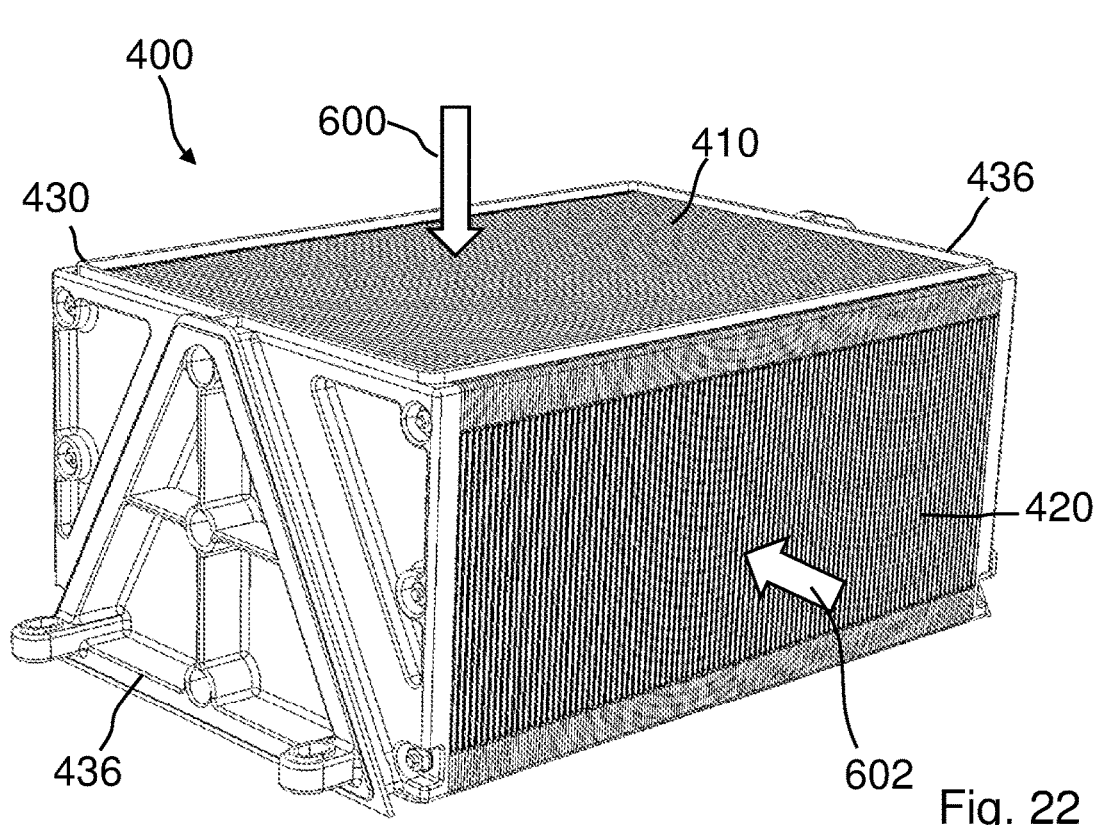
FIG. 21 shows a stack plate device for a humidifier, in particular for a fuel cell system, according to an embodiment of the invention during assembly, in an isometric view.
FIG. 22 shows a stack plate device according to an embodiment of the invention, in an isometric view.

FIG. 21 depicts a stack plate device 400 for a humidifier 1000, in particular for a fuel cell system, according to an embodiment of the invention during assembly, in isometric view, whereas in FIG. 22 the stack plate device 400 is depicted in the final assembled state.

The stack plate device 400 comprises a plurality of stack plates 100, which follow one another alternately in a stacking direction 500 with first sides 126 of adjacent stack plates 100 joined and second sides 125 of adjacent stack plates 100 joined. Each stack plate 100 comprises a peripheral frame 120 which encloses a through-opening 130.

At least first and second groups of flow channels 410, 420 are formed in the stack plate device 400, which each having a flow direction transversely to one another and being separated by semi-permeable layers 110, in particular moisture-permeable layers 110.

Three of the alternatingly successive stack plates 100 each form two of the flow channels 410, 420, which are formed such that flow can pass through them transversely to one another.

Successive stack plates 100 are connected to one another in a fluid-tight manner except for inflow or outflow regions 210, 212; 220, 222 of the flow channels 410, 420. In particular the successive stack plates 100 are connected to one another at the frames 120 of the stack plates 100. In particular the successive stack plates 100 may be bonded to one another.

Receptacles 432 for an axial or radial gasket 430 are arranged on outer sides of the stack plate device 400. In particular the frames 120 of the successive stack plates 100 may have incisions 170 by means of which the receptacle 432 is formed.

The gasket 430 can be used to seal the inlet region of the first fluid flow 600, i.e., the exhaust gas from the fuel cell, when the stack plate device 400 is installed in the housing 1002 of a humidifier 1000, as shown in FIG. 22. Bypass flow that would otherwise occur in the housing 1002 can thus be effectively prevented.

Tension anchors 434 are used for joining the stack plates 100 and keep them under a certain pressure for tight sealing one stack plate 100 against each other. The tension anchors 434 are fixed to end plates 436 of the stack plate device 400 on both ends.

In the embodiment shown the first fluid 600, e.g. an exhaust gas, enters the stack plate device 400 through a first group of flow channels 410 from above and leaves the stack plate device 400 on the opposite side. The second fluid 602, e.g. supply air, enters the stack plate device 400 through a second group of flow channels 420 from a right side in the Figure and leaves the stack plate device 400 on the opposite side.

Figure 23:
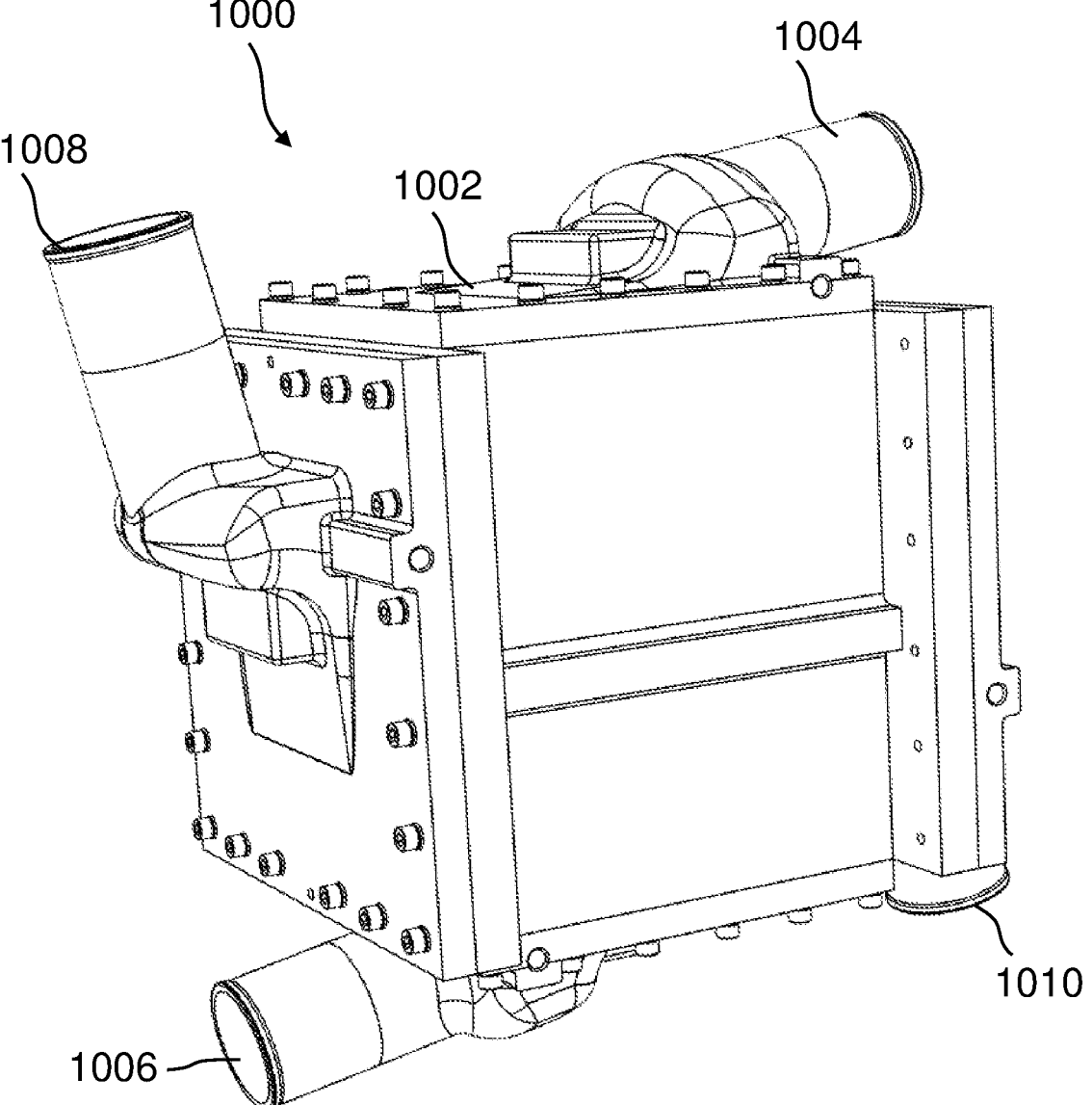
FIG. 23 shows a humidifier for a fuel cell system according to an embodiment of the invention, in an isometric view.

FIG. 23 depicts a humidifier 1000 for a fuel cell system according to an embodiment of the invention, in isometric view.

The humidifier 1000 comprises a housing 1002 which has at least one inlet 1004 for a first fluid 600, in particular an exhaust gas of the fuel cell system, an inlet 1008 for a second fluid 602, in particular a supply air of the fuel cell system, an outlet 1006 for the first fluid 600 and an outlet 1010 for the second fluid 602. The humidifier 1000 further comprises a stack plate device 400, in which a plurality of stack plates 100 alternately following one another with first sides 126 of adjacent stack plates 100 joined and second sides 125 of adjacent stack plates 100 joined in a stacking direction 500 are arranged. Three each of the alternately successive stack plates 100 form a first and a second group of flow channels 410, 420 formed transversely to each other for flow of the first or second fluid 600, 602 therethrough. The first group of flow channels 410 are arranged between the inlet 1004 and the outlet 1006 for the first fluid 600 and the second group of flow channels 420 are arranged between the inlet 1008 and the outlet 1010 for the second fluid 602.

The invention claimed is:

1. A stack plate of a stack plate device of a humidifier, the stack plate comprising:

inlay parts extending along two opposing front or longitudinal ends of the stack plate;

a semipermeable layer disposed on and being stabilized by the inlay parts; and a frame disposed on multiple portions of the semipermeable layer that are disposed on the inlay parts, the frame circumferentially enclosing a through-opening in the stack plate, wherein a remaining portion of the semipermeable layer completely covers the through-opening, wherein an outer circumferential section of the semipermeable layer and the inlay parts are overmolded by the frame, and wherein opposing front ends of the frame define inflow and outflow regions, respectively, on a first side of the frame for a second fluid, and opposing longitudinal ends of the frame define inflow and outflow regions, respectively, on a second side of the frame for a first fluid.

2. The stack plate of claim 1, wherein the opposing longitudinal ends of the frame comprise a first connecting region on the first side of the frame, with a first sealing, the first connecting region being connectable to another first side of another frame of another stack plate adjacent to the stack plate in the stack plate device, and wherein the opposing front ends of the frame comprise a second connecting region on the second side of the frame, with a second sealing, the second connecting region being connectable to another second side of another frame of another stack plate adjacent to the stack plate in the stack plate device.

3. The stack plate of claim 1, wherein the frame comprises flow guiding elements disposed at the inflow and outflow regions on the first side of the frame for the second fluid.

4. The stack plate of claim 1, further comprising a grid-like support element disposed on each of the first side and the second side of the frame and spanning the through-opening in the stack plate.

5. The stack plate of claim 4, wherein the grid-like support element on the first side of the frame differs from the grid-like support element on the second side of the frame in any one or any combination of height, thread spacing and a crossing angle of struts.

6. The stack plate of claim 1, wherein the inlay parts comprises:

two first inlay stripes respectively extending along the two opposing front ends of the stack plate and respectively being overmolded by the frame at the opposing front ends of the frame; and two second inlay stripes respectively extending along the two opposing longitudinal ends of the stack plate and respectively being overmolded by the frame at the opposing longitudinal ends of the frame, and wherein the semipermeable layer is interposed between the first two inlay stripes and the second two inlay stripes.

7. The stack plate of claim 1, wherein the inlay parts comprise a grid-like plate extending along and supporting a surface of the semipermeable layer.

8. The stack plate of claim 7, wherein the grid-like plate comprises ribs being aligned in an oblique manner to a flow direction of the first fluid and the second fluid.

9. A stack plate device of a humidifier, the stack plate device comprising:

a plurality of stack plates, each of which being the stack plate of claim 1, the plurality of stack plates being stacked one atop of each other alternately in a stacking direction, first sides of adjacent ones of the plurality of stack plates facing each other, and second sides of adjacent ones of the plurality of stack plates facing each other; and a first group of flow channels and a second group of flow channels for fluid flow transversely and respectively through lateral sides of the plurality of stack plates to one another, the first group of flow channels and the second group of flow channels being separated by a plurality of semipermeable layers, each of which being the semipermeable layer, and every three of alternatingly successive ones of the plurality of stack plates forming two of the first group of flow channels and the second group of flow channels.

10. The stack plate device of claim 9, wherein successive ones of the plurality of stack plates are connected in a fluid-tight manner except at the inflow or outflow regions on the first side and the second side of the frame.

11. The stack plate device of claim 9, further comprising one or more receptacles for an axial or radial gasket, the one or more receptables being disposed on an outer side of the stack plate device, and the one or more receptables being incisions in the frame of each of the plurality of stack plates.

12. A humidifier comprising:

the stack plate device of claim 9; and a housing comprising:

an inlet for the first fluid;

an inlet for the second fluid;

an outlet for the first fluid; and an outlet for the second fluid, wherein the first group of flow channels and the second group of flow channels are respectively for flow of the first fluid and the second fluid therethrough, wherein the first group of flow channels is arranged between the inlet and the outlet for the first fluid, and wherein the second group of flow channels are arranged between the inlet and the outlet for the second fluid.

\* \* \* \* \*